(12) United States Patent
Egger

(10) Patent No.: US 7,766,990 B2
(45) Date of Patent: Aug. 3, 2010

(54) APPARATUS FOR THE SEPARATION OF LIQUID FROM A FLUID FLOW LOADED WITH LIQUID DROPLETS

(75) Inventor: Daniel Egger, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 251 days.

(21) Appl. No.: 11/983,910

(22) Filed: Nov. 13, 2007

(65) Prior Publication Data

US 2008/0148942 A1   Jun. 26, 2008

(30) Foreign Application Priority Data

Dec. 22, 2006   (EP) .................................. 06127169

(51) Int. Cl.
*B01D 46/00*   (2006.01)

(52) U.S. Cl. .............................. 55/482; 55/428; 55/429; 55/462; 55/485; 55/486; 55/525

(58) Field of Classification Search .................. 55/428, 55/429, 430, 431, 462, 463, 464, 482, 485, 55/486, 487, 525, 526
See application file for complete search history.

(56) References Cited

U.S. PATENT DOCUMENTS

| 3,022,859 | A | | 2/1962 | Sexton |
| 3,066,462 | A | | 12/1962 | Yap |
| 3,403,498 | A | | 10/1968 | Pasha |
| 3,997,303 | A | * | 12/1976 | Newton ........................ 95/284 |
| 4,036,612 | A | * | 7/1977 | Guttmann ..................... 55/282 |
| 5,139,544 | A | * | 8/1992 | Lucero et al. .................. 95/211 |
| 5,230,725 | A | * | 7/1993 | Chowaniec ................... 55/440 |
| 5,312,464 | A | * | 5/1994 | Gay ............................ 96/356 |
| 7,318,855 | B2 | * | 1/2008 | Newman et al. ............... 95/262 |
| 7,344,580 | B2 | * | 3/2008 | Lindblom ..................... 55/486 |
| 7,632,339 | B2 | * | 12/2009 | Singh .......................... 95/273 |

FOREIGN PATENT DOCUMENTS

FR   2 599 273 A   12/1987

\* cited by examiner

*Primary Examiner*—Michael A Marcheschi
*Assistant Examiner*—Robert A Clemente
(74) *Attorney, Agent, or Firm*—Francis C. Hand; Carella, Byrne, Cecchi

(57) ABSTRACT

The apparatus serves for the separation of liquid from a fluid flow loaded with liquid droplets, which can be directed through separator structures in counterflow to separated liquid. The separated liquid flows away on surfaces of the separator structures into a collector located at the inlet are of a separator structure. The collectors are, in turn, connected to a collection line via a collection passage.

7 Claims, 3 Drawing Sheets

APPARATUS FOR THE SEPARATION OF LIQUID FROM A FLUID FLOW LOADED WITH LIQUID DROPLETS

FIELD OF THE INVENTION

This invention relates to an apparatus or a device for the separation of liquid from a fluid flow loaded with liquid droplets.

BACKGROUND OF THE INVENTION

As is known, devices for the separation of a liquid from a fluid flow loaded with liquid droplets have utilized separator structures through which the fluid flow passes in counterflow to the separated liquid. These separator structures form at least two stages and each separator structure has an inlet area for the entry of the fluid flow which is arranged lower than a corresponding outlet area. Typically, the separated liquid flows away on surfaces of the separator structures. Generally, the fluid is a gas or a liquid that has a density which is smaller than that of the liquid to be separated.

In the oil and gas industry, in the treatment of two phase or multi-phase mixtures which contain a discrete phase in the form of aqueous droplets in a gaseous phase, a separation of the phases is often necessary. In the separators used for this, separating methods can be carried out using the force of gravity and/or inertial force in the form of centrifugal forces. In both methods, the flow of gas loaded with droplets of liquid, i.e. the fluid flow, is conveyed to a separating surface on which, on the one hand, a separation occurs by simple deflection of the flow or, on the other hand, by the induction of a swirling flow.

Essentially there are two factors influencing the efficiency of the separators. On the one hand, the droplet size has an influence: the smaller the droplets in the two-phase flow are, the more difficult it is to transport them out of the fluid flow to the separating surfaces. That is to say, only with large droplets is there sufficient inertia to cause a deflection. The second fundamental influence on the efficacy is the re-separation of drops from a fluid film located on the separating surfaces due to a high speed of the fluid flow. The thickness of the liquid film located on the surface of the separator structure influences, on the one hand, the free through flow area which is available. On the other hand, the stability of the film is reduced with increasing thickness: a formation of waves on the fluid film can lead to a droplet being separated.

An increase of the amount of liquid, i.e. of the fluid flow, leads to flooding of the separator and, thus, to the capacity limit of the separator being reached. The efficiency of the separation process decreases drastically in the region of the capacity limit.

A separator structure is known from U.S. Pat. No. 4,744, 806 wherein droplets of liquid can be separated from a fluid flow, in particular, a mist from a mist-containing gas stream. This separator structure has a heterogeneous construction transverse to the direction of flow. In main zones with a higher density of the separator structure, liquid is predominantly separated, while in auxiliary zones with lower density, which are arranged between the main zones, separated liquid and liquid entering these auxiliary zones flows away in counterflow to the fluid flow. The drainage by means of auxiliary zones facilitates a reduction of the film thickness in the main zones, thereby increasing its capacity.

It is an object of the invention to reduce the film thickness of a fluid flow on a separating surface in a separator in order to increase the capacity of the separator It is another object of the invention to provide an apparatus in which liquid can be efficiently separated from a fluid flow loaded with liquid droplets.

SUMMARY OF THE INVENTION

Briefly, the invention provides an apparatus for the separation of liquid from a fluid flow containing liquid droplets that has a plurality of separator structures disposed in a path of flow of a fluid containing liquid droplets for the separation of liquid from the flow of fluid passing therethrough. Each separator structure has an inlet area for the inflow of fluid and an outlet area above the inlet area for the outflow of fluid.

The apparatus also includes a plurality of collectors, each of which is disposed at the inlet area of a respective separator structure for receiving the liquid separated therein and a collection line communicating with the collectors for receiving the liquid separated in the collectors. In addition, each collector connects to a collection passage that communicates the collector with the collection line for conveying the separated liquid out of the apparatus.

Each separator structure forms a stage for the separation of liquid from the flow of fluid passing therethrough and for the flow of the separated liquid in counterflow to the flow of fluid.

During operation, the separated liquid flows away on surfaces of the separator structures into the collectors and from there into the collection line.

The stages of the separator structures may be made of a pile of separation elements of woven or knitted wire or as an ordered packing having a plurality of corrugated foils, each of which has corrugations disposed at an angle to the corrugations of an adjacent foil to form criss-crossing channels for the fluid flow.

The separator structures may have specific surface areas of different sizes, with the specific surface areas increasing in the flow direction of the fluid flow.

In one embodiment, each collector includes a plurality of collection elements disposed in spaced apart parallel relation to define a plurality of gaps for the fluid flow and to receive separated liquid thereon. Each collection element has a collection trough for receiving the separated liquid and communicates with a respective collection passage. In addition, each collection element includes openings for a direct passage of the fluid flow therethrough and each opening is offset vertically relative to an opening in a collection element therebelow to laterally deflect at least 50% of the fluid flow passing through the collection element therebelow.

In another embodiment, the apparatus is constructed with a means between at least two of the separator structures for directing the fluid flow into a vortex flow for separating liquid droplets therefrom under centrifugal force.

These and other objects and advantages of the invention will become more apparent from the following detailed description taken in conjunction with the accompanying drawings.

DETAILED DESCRIPTION OF THE INVENTION

Figure 1:
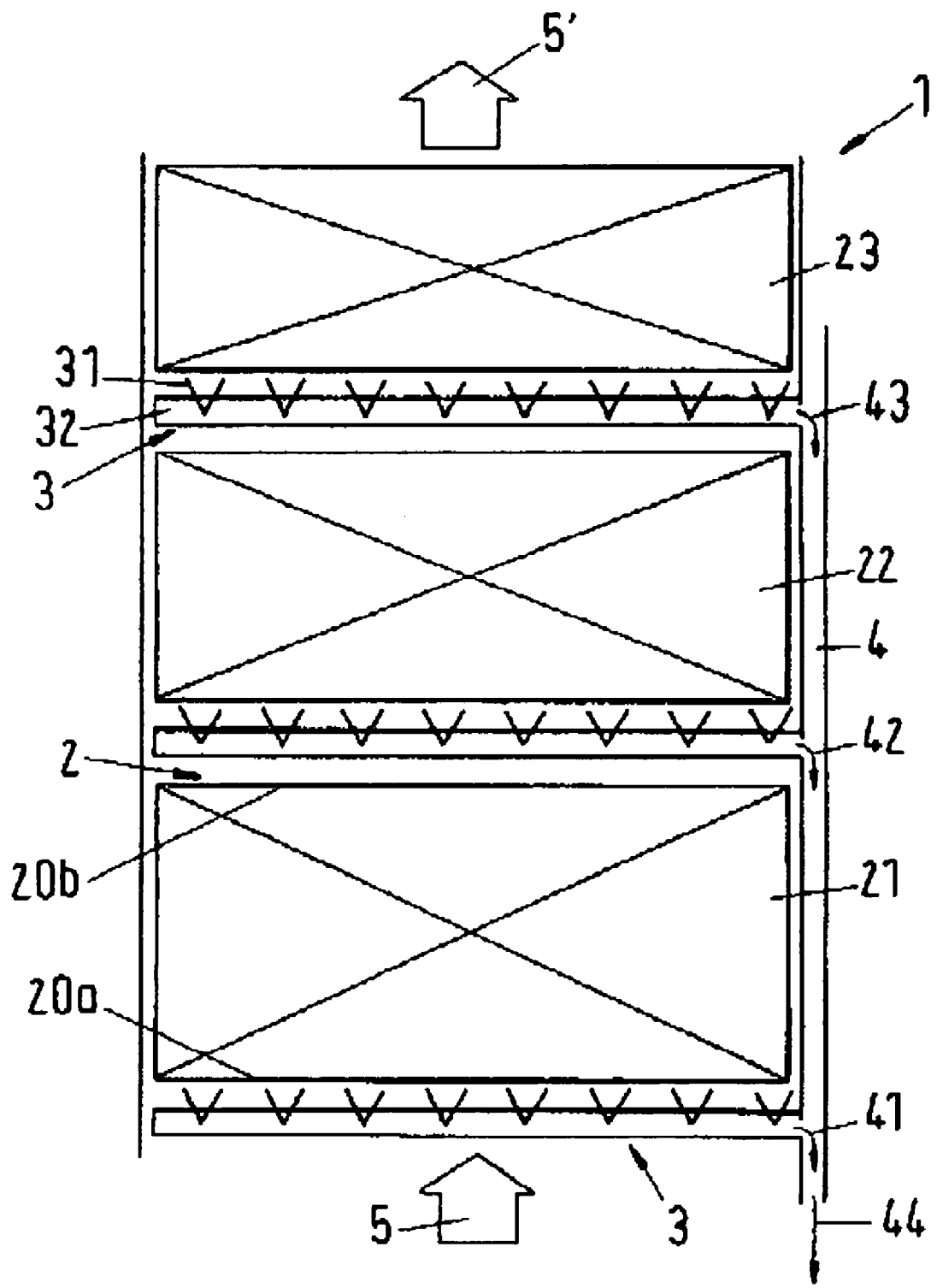
FIG. 1 illustrates a schematic view of a multi-stage droplet separator in accordance with the invention.

Referring to FIG. 1, the multi-stage droplet separator 1 operates for the separation of liquid out of a fluid flow 5 loaded with droplets of liquid. The fluid flow 5, which as a rule is a flow of gas, is directed through a plurality of separator structures 2, in each of which separated liquid flows in counterflow on surfaces of the separator structure 2. The surfaces can be wetted with respect to the liquid to be separated.

In the embodiment shown, the separator structures 2 form three stages 21, 22 and 23. Each separator structure 2 has an inlet area 20a for the entry of the fluid flow 5, which is arranged lower than a corresponding outlet area 20b for the fluid flow.

A collector 3 for liquid flowing back out of each separator structure 2 is provided in each case at the inlet areas 20a and is connected to a collection line 4 outside the separator structure via a collection passage 32. Fluid flows 41, 42 and 43 enter into the collection line 4 from the three stages 21, 22 and 23, where they unite to a fluid flow 44.

As indicated, a wet fluid flow 5 enters the multi-stage droplet separator 1 and a dry fluid flow 5' exits from the separator 1, on the other hand, and a flow 44 of the separated liquid exits from the separator on the other hand.

If a plurality of stages is provided, collectors 3 may be omitted at individual stages. If a collector 3 is not present the separated liquid flows further into the adjacent stage relative to the fluid flow 5. If this adjacent stage has a sufficiently large take-up capacity for separated liquid, then the ability of the apparatus 1 to function is not impaired substantially by the additional load. However, since the large take-up capacity for separated liquid results, as a rule, in a reduced ability to separate, it is advantageous when all stages are equipped with collectors 3.

The ability to separate depends in a non-linear manner on the amount of liquid taken up by the separator structure 2. Thus, a partially flooded separator 2 can have a better ability to separate, in particular as regards very small droplets of liquid. (Flooding is the operating point at which a significant entrainment of the droplets to the next stage takes place and a build-up of a hold up of liquid in the separator element is present.) In a case such as this, the absence of a collector 3, which leads to flooding, can also be advantageous. Whether or not it is advantageous depends on the choice of the separator structures 2 and on the spectrum of the droplet sizes in the fluid flow 5.

The separator structures 2 are each made of a pile of separation elements and/or of a stack of layers, which are woven or knitted out of wire, in particular metal wire. In a further embodiment, at least one stage includes a structured packing which, for example, forms a crossed channel structure. This packing is made up of at least one composite layer of corrugated foils or of foils folded in a zigzag shape. These layers are vertically aligned and form inclined flow channels. The flow channels of adjacent layers cross each other and are open to one another.

As a rule the separator structures have specific surface areas (or densities) of different sizes. The specific surface areas increase to advantage in the flow direction of the fluid flow 5.

Each collector 3 is assembled from a plurality of collection elements 31. Two advantageous types of collectors 3 are described below.

The first type of collector 3 is indicated in FIG. 1 wherein the collection elements are in the form of collection troughs 31 arranged in parallel, between which are gaps provided for a direct entry of the fluid flow into the separator structure. A flow pattern forms directly over the entry surface or inlet area 20a, due to which the separated liquid is forced onto the lee zones behind the collection elements 31 where the liquid can flow away into the collection troughs 31 unhindered by the flow of the fluid.

Figure 2:
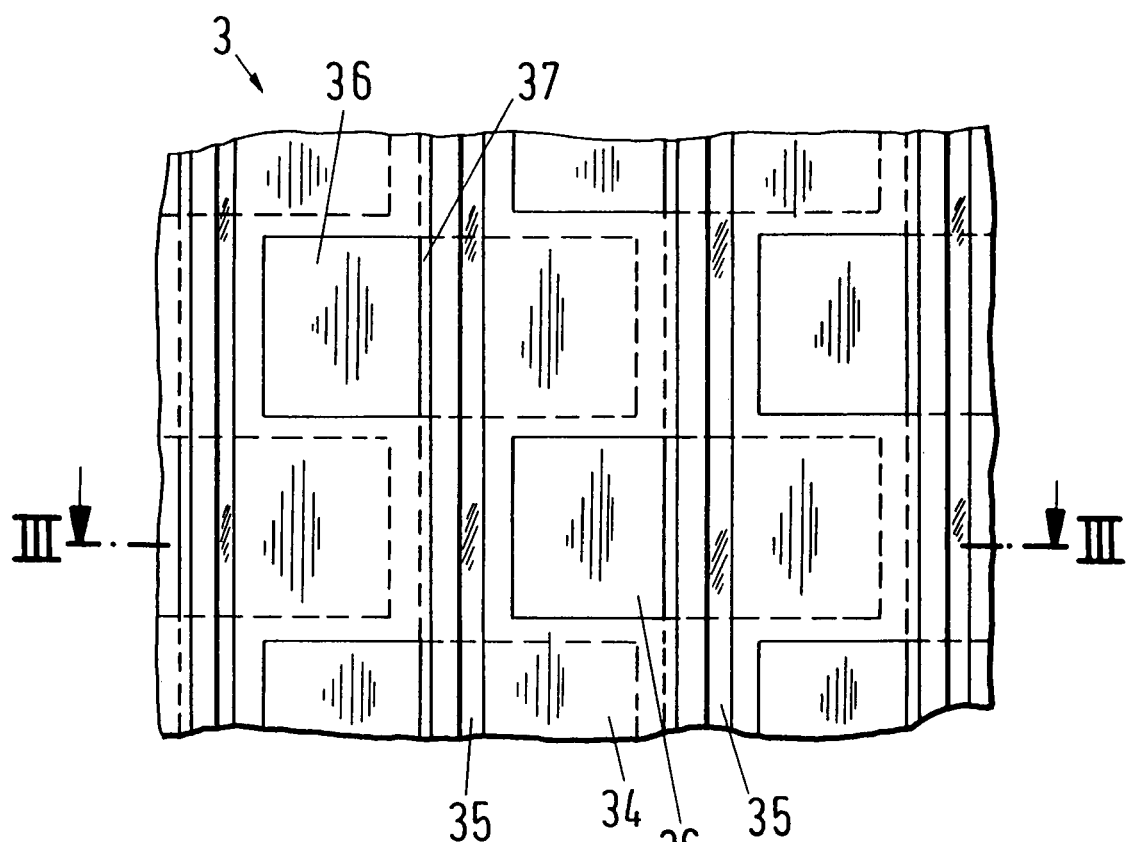
FIG. 2 illustrates a bottom view of a liquid collector in accordance with the invention.
Figure 3:
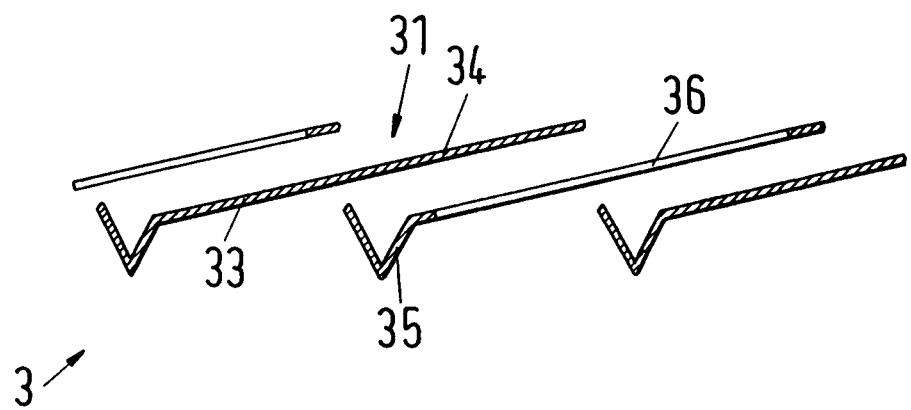
FIG. 3 illustrates a sectional view through the collector of FIG. 2.

Referring to FIGS. 2 and 3, the second type of collector 3 includes collection elements 31 in the form of a plate having at least one collection area 34 and a collection trough 35 leading to a collection channel.

As indicated in FIG. 2, each element 31 of the collector 3 has passage openings 36 or gaps for the fluid flow 5 which are distributed over the inlet area 20a of the associated separator structure 2. A direct passage of the fluid flow 5 through the collection elements 31 is prevented in each case completely or partly—up to at least 50%—due to a deflecting surface part 33 (see FIG. 3) of the adjacent collection element. A direct passage is only possible in a narrow strip 37. In similar manner to the collector of FIG. 1 the direct passage can also be larger than in FIG. 2, without this having an unfavorable effect.

As indicated in FIG. 3, the collector 3 includes a plurality of collection elements 31 disposed in vertically spaced apart parallel relation to define a plurality of gaps for the fluid flow and to receive separated liquid thereon. Each collection element 31 has collection trough 35 for receiving the separated liquid and communicating with a respective collection passage (not shown). As also indicated, the passage openings 36 in the collection elements are offset vertically relative to an opening in a collection element therebelow to laterally deflect at least 50% of the fluid flow passing through the collection element therebelow.

The collector 3 has a separator function in addition to the collector function due to deflections of the fluid flow. This applies to both of the types of collector described above, in particular to the first type. In the second type, additional structure elements influencing the flow can act on the collection surfaces 34 or between these as a separator means.

Figure 4:
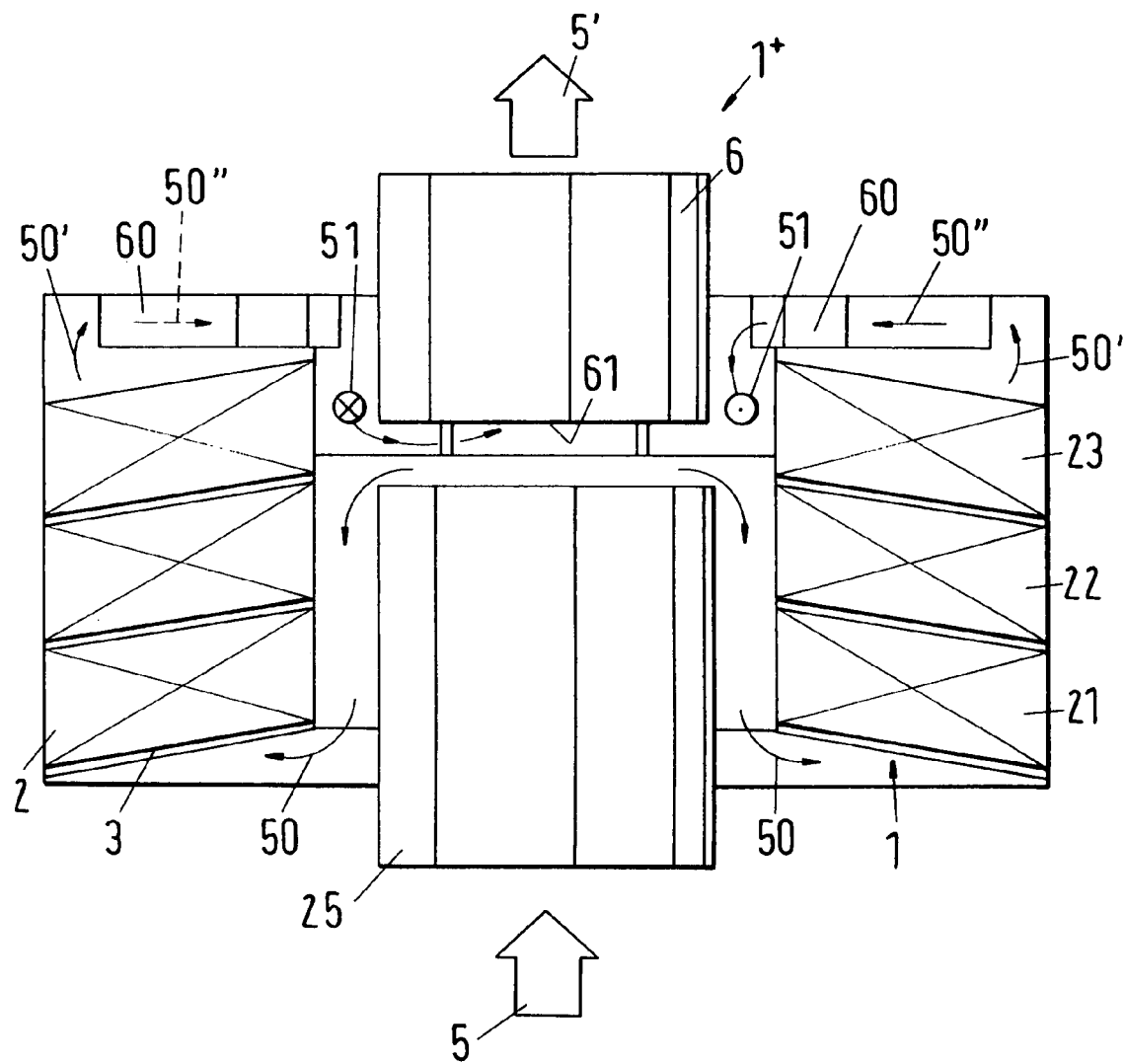
FIG. 4 illustrates a schematic view of a modified apparatus in accordance with the invention.

Referring to FIG. 4, wherein like reference characters indicate like parts as above, the multi-stage droplet separator apparatus $1^+$ includes at least one additional separator stage 6 that operates according to a different operating principle. The apparatus $1^+$ also contains an entry stage 25, in which separator structures and liquid collectors can be arranged as above described. The entry stage 25 can, however, also contain other installations, for example coalescers for influencing the size spectrum of the droplets carried along by the fluid flow 5.

The apparatus $1^+$ has a centrally symmetrical construction and includes three stages 21, 22 and 23 which are formed of annular separator structures 2 and collectors 3. Alternatively, the number of stages can also be 2 or more than 3.

The flow of the fluid to be treated is indicated by the arrows 50, 50', 50" and 51. After passage through the droplet separator 1, the flow 50' of the fluid, which is still loaded with a remainder of liquid, is conveyed radially to the center and through blades 60 (arrow 50") and, in this arrangement, is set into a vortex flow 51.

The vortex flow 51 enters through an aperture at the base 61 of the separator stage 6 into a region in which the remainder of liquid is further reduced by means of a suitably formed structure and using centrifugal forces. A centrifugal separation of this kind is—as in the example shown—preferably to be provided as a final stage.

During operation of the multi-stage droplet separator 1, separation is, for example, be carried out in a first stage with an at least partially flooded separator structure. In this method, a continuous phase, which is formed by separated liquid is passed as a discrete phase from the fluid flow in the form of bubbles. Small droplets can thus precipitate in the individual bubbles on their surfaces.

The fluid flow can be measured in such a way that in stages with a higher load of liquid the pressure drop reaches a value, which leads to flooding.

In a particular application of the method, it can be necessary that a pressure difference which is not too large exists between the wet flow of fluid containing liquid to be separated and the dry flow of fluid 5' (not containing the separated liquid). In this case, and with the apparatus 1⁺ of FIG. 4, for example, it is possible to proceed as follows:

In the apparatus 1⁺, the total pressure drop of a dry fluid flow 5' is measured as a function of its volumetric flow rate. The apparatus 1⁺ is then operated with a wet fluid flow 5 for which a pressure drop occurs, which does not exceed the double value of the corresponding pressure drop for the dry fluid flow or a different pre-determined value. If the pre-determined value is exceeded the wet fluid flow 5 is reduced in such a way that the named condition is fulfilled.

In the apparatus 1 which is an arrangement of separator structures connected in series in the flow direction, the thickness of the film of liquid on the surfaces of the separator structures is reduced by the interstage leading away of liquid. A separation of droplets which arises from a certain liquid film thickness onwards, only takes place at higher liquid flows or gas flows. Moreover, a hydraulic decoupling of the individual stages is achieved, since the separated liquid no longer flows through all the stages located before this in the flow of gas.

The advantage made possible by the apparatus 1 is a control of the fluid film on the separator surfaces by the selection of a suitable density (specific surface) of the separator structure, combined with a separate collection and leading away of the liquid. It is also possible to intentionally achieve a coalescence by partial flooding of the separator structure for example, by the omission of the liquid drainage at one stage so that, decoupled from this, the separation of the droplets can take place at the next stage.

A flooding of the lowest stage can be provided as being advantageous, in the sense of an arrangement which is as space saving as possible, if parts of the separator apparatus arranged downstream in the fluid flow 5 ensure the necessary separating efficiency. The blocking of the cross-section for the fluid by a layer of fizzy liquid which has formed due to the flooding often has a positive effect since fine droplets of liquid also coalesce on the surface of the liquid. The production of droplets by separation from the film of liquid is usually subject to a different mechanism than the production of droplets which are fed into the apparatus 1 with the flow of fluid 5. The drops originating from this separation can be significantly larger than the droplets and can thus be separated more easily in the next stage.

What is claimed is:

1. An apparatus for the separation of liquid from a fluid flow containing liquid droplets, said apparatus comprising
   a plurality of separator structures disposed in series in a path of flow of a fluid containing liquid droplets for passage of the flow serially therethough, each said separator structure forming a stage for the separation of liquid from the flow of fluid passing therethrough and for the flow of the separated liquid in counterflow to the flow of fluid, each said separator structure having an inlet area for the flow of fluid and an outlet area above said inlet area for the flow of fluid;
   at least a pair of collectors, each said collector being disposed at said inlet area of a respective one of said separator structures for receiving the liquid separated in said stage thereof, each said collector including a plurality of troughs disposed in spaced apart parallel relation to define a plurality of gaps for the fluid flow and to receive separated liquid therein, each said trough communicating with a respective collection passage;
   a collection line for receiving the liquid separated in each said collector; and
   a plurality of collection passages, each said collection passage communicating a respective collector with said collection line for conveying the liquid separated therein to said collection line.

2. An apparatus in accordance with claim 1 wherein each said separator structure is made of a pile of separation elements of woven wire.

3. An apparatus in accordance with claim 1 wherein at least one of said stages includes a structured packing having a plurality of corrugated foils, each foil having corrugations disposed at an angle to the corrugations of an adjacent foil to form criss-crossing channels for the fluid flow.

4. An apparatus in accordance with claim 1 wherein said separator structures have specific surface areas of different sizes, with the specific surface areas increasing in the flow direction of the fluid flow.

5. An apparatus for the separation of liquid from a fluid flow containing liquid droplets, said apparatus comprising
   a plurality separator structures disposed in a path of flow of a fluid containing liquid droplets, each said separator structure forming a stage for the separation of liquid from the flow of fluid passing therethrough and for the flow of the separated liquid in counterflow to the flow of fluid, each said separator structure having an inlet area for the flow of fluid and an outlet area above said inlet area for the flow of fluid,
   at least a pair of collectors, each said collector being disposed at said inlet area of a respective one of said separator structures for receiving the liquid separated in said stage thereof, each said collector including a plurality of collection elements disposed in vertically spaced apart relation, each said collection element having openings for a direct passage of the fluid flow therethrough, each said opening being offset vertically relative to an opening in a collection element therebelow to laterally deflect at least 50% of the fluid flow passing through said collection element therebelow;
   a collection line for receiving the liquid separated in each said collector; and
   a plurality of collection passages, each said collection passage communicating a respective collector with said collection line for conveying the liquid separated therein to said collection line.

6. An apparatus for the separation of liquid from a fluid flow containing liquid droplets, said apparatus comprising
   a plurality of separator structures disposed in a path of flow of a fluid containing liquid droplets, each said separator structure forming a stage for the separation of liquid from the flow of fluid passing therethrough and for the flow of the separated liquid in counterflow to the flow of fluid, each said separator structure having an inlet area for the flow of fluid and an outlet area above said inlet area for the flow of fluid;
   means between at least two of said separator structures for directing the fluid flow into a vortex flow for separating liquid droplets therefrom under centrifugal force;
   at least a pair of collectors, each said collector being disposed at said inlet area of a respective one of said separator structures for receiving the liquid separated in said stage thereof;

a collection line for receiving the liquid separated in each said collector; and a plurality of collection passages, each said collection passage communicating a respective collector with said collection line for conveying the liquid separated therein to said collection line.

7. An apparatus for the separation of liquid from a fluid flow containing liquid droplets, said apparatus comprising a plurality of separator structures disposed in series in a path of flow of a fluid containing liquid droplets for the separation of liquid from the flow of fluid passing serially therethrough, each said separator structure having an inlet area for the inflow of fluid and an outlet area above said inlet area for the outflow of fluid:

a plurality of collectors, each said collector being disposed at said inlet area of a respective one of said separator structures for receiving the liquid separated therein; and a collection line communicating with said collectors for receiving the liquid separated in said collectors.

* * * * *